Aug. 4, 1970     J. M. SCHAEFER     3,523,235
SELF-OSCILLATING SWITCHING TYPE POWER SUPPLY
Filed March 1, 1968
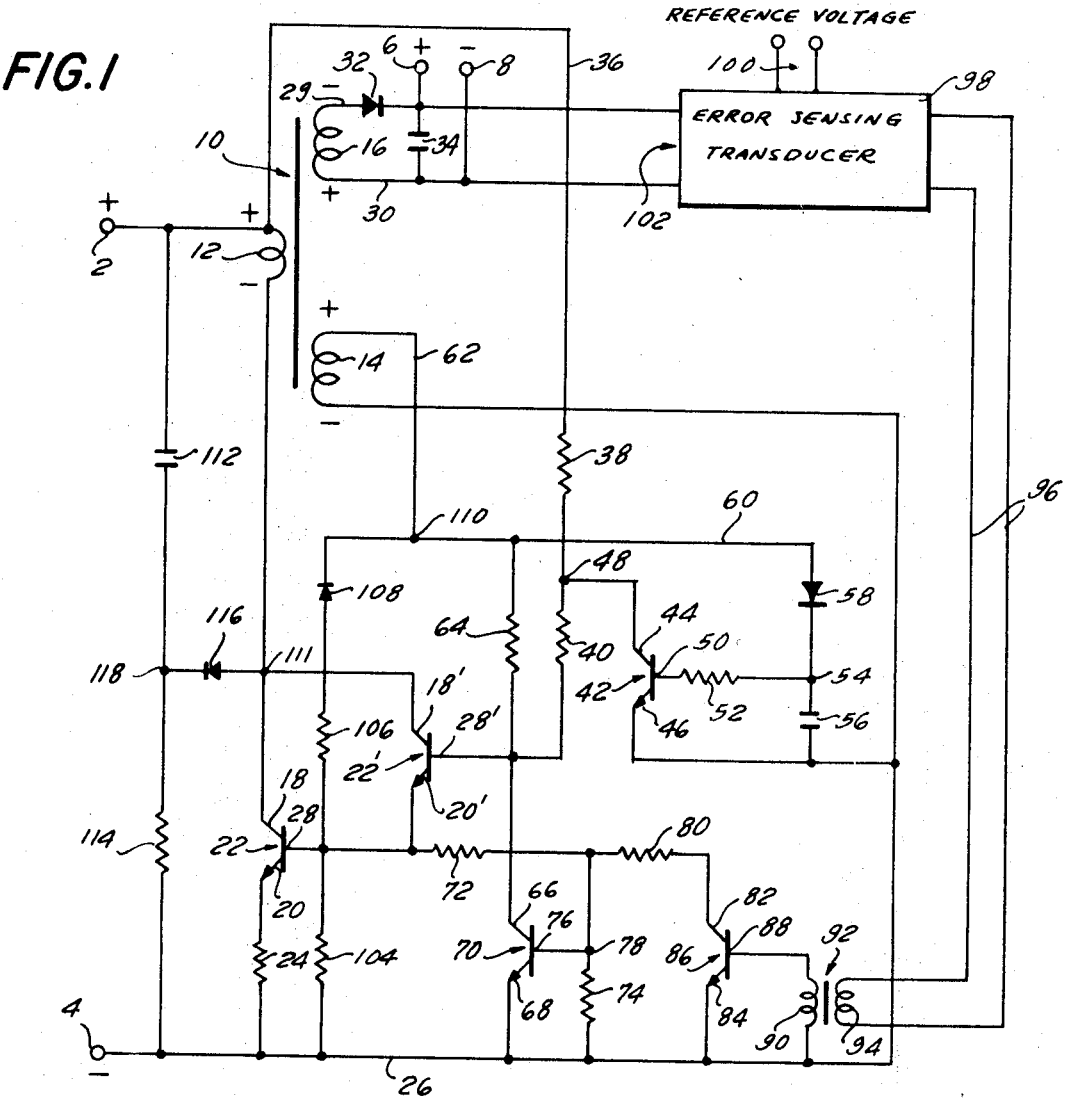
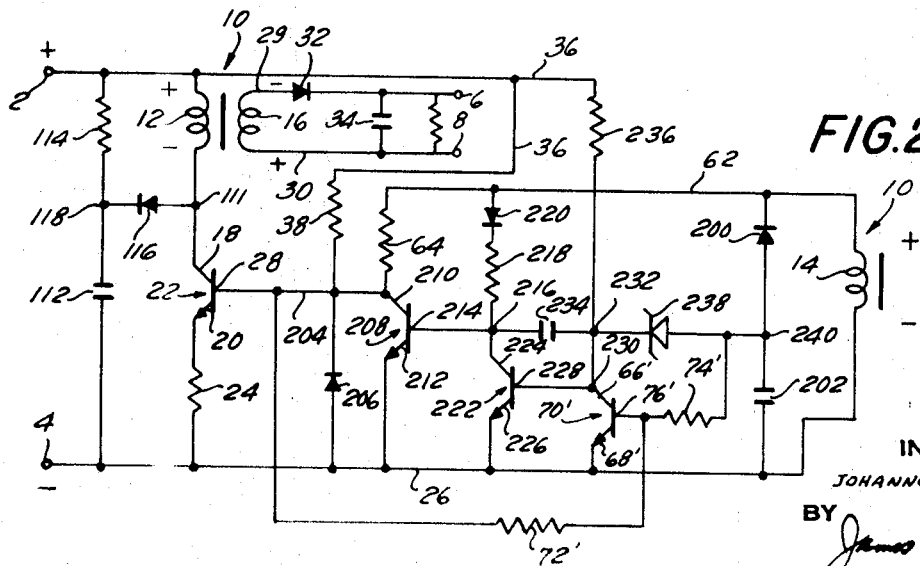
INVENTOR
JOHANNES M. SCHAEFER
BY *James and Franklin*
ATTORNEY

United States Patent Office 3,523,235
Patented Aug. 4, 1970

3,523,235
SELF-OSCILLATING SWITCHING TYPE
POWER SUPPLY
Johannes M. Schaefer, Grossweier, Germany, assignor to Technipower Incorporated, Ridgefield, Conn., a corporation of Connecticut
Continuation-in-part of application Ser. No. 651,489, July 6, 1967. This application Mar. 1, 1968, Ser. No. 709,658
Int. Cl. H02m 3/32; H03k 3/30
U.S. Cl. 321—2
21 Claims

ABSTRACT OF THE DISCLOSURE

A switching type power supply in which the control for the switching is feedback-connected to the output so as to produce a system which is inherently oscillatory between switch-on and switch-off conditions, and in which one or more output parameters may be varied and maintained at predetermined value by modifying the feedback effect; positive starting means are provided which is rendered ineffective when the desired oscillatory condition has been established.

---

The present invention relates to a switching type power supply, and in particular to one in which the switching control is affected by circuitry of markedly improved simplicity and reliability, in which adjustment and regulation of a desired output parameter is readily and accurately accomplished, and in which the input and output are isolated by a transformer affected by frequencies much higher than line frequencies.

This application is a continuation-in-part of my prior application Ser. No. 651,489, filed July 6, 1967 entitled "Self-Oscillating Switching Type Power Supply" and assigned to the assignee of this application.

Switching-type power supplies are well known. They generally comprise a circuit operatively connected to the output in which an electronic switch such as a transistor is located, the overall output of the system being determined by the relative proportion of switch-on times as compared to switch-off times; the greater the proportion of the time that the switch is on, the greater will be the output. Means are usually provided for sensing the output and for controlling and modifying the relative proportions of switch-on and switch-off times in order to maintain the output at desired value. In the past this has involved providing a circuit separate and distinct from the power circuits which controlled the switch timing and which in turn was controllable in accordance with the sensed parameter, and using a pair of alternately conductive switching circuits which had to be balance. This all added an appreciable degree of complexity to the power supplies in question, and such complexity had its inevitable counterpart in expense and comparative lack of reliability.

It is the prime object of the present invention to provide a switching type power supply which eliminates the need for a separate timing circuit and which uses but a single switching circuit. It is a further prime object of the present invention to devise a switching type power supply in which control of the output can be accomplished in a simpler manner than has been the case heretofore, but without any appreciable loss in accuracy.

To these ends the output circuit is feedback-connected, preferably electromagnetically, to the circuit where the switching transistor is located, thereby to produce an inherently self-oscillatory system in which the switching transistor will shift between switch-on and switch-off conditions by virtue of that feedback, and without having to provide any separate timing circuit. The transformer which is used for this feedback is affected by high frequency currents in the kilohertz range, and hence may be small and light. Moreover, and quite surprisingly, it has been found that this simplification of the general circuit arrangement under discussion results in a system in which the switching can be varied and controlled to regulate the output in a comparably equally simple fashion so that a regulated power supply of a high degree of accuracy can be produced with exceptionally simple circuitry.

Regulation may be achieved in accordance with input or supply voltage, output voltage, output current, or combinations thereof, all by means of simple and reliable circuitry, capable of effecting isolation between output and control circuits and of achieving a high degree of accuracy.

Means may be provided for starting the system by positively bringing it to its oscillatory condition merely by connecting it to a source of power, and thereafter automatically disabling this starting means and permitting the system to oscillate between switch-on and switch-off conditions in accordance with its inherent tendency as modified by the simple superimposed regulating control.

To these ends the switching transistor is connected in series with one winding section of a plural-winding-section transformer, a second section of which is connected in feedback relation to the switching transistor control. A third winding section of the transformer constitutes the output of the system and is adapted to be connected in series with a rectifier. Means including the feedback connection mentioned above are provided to sense the current which passes through the first winding section when the switching transistor is on, and to turn the switching transistor off in response to such sensing.

During the switch-on portion of the cycle the voltage induced in the third or output winding section is preferably opposed to the rectifier connected in series therewith, so that no output current flows. When the switching transistor turns off an opposite voltage appears across the first winding section and hence across the other two winding sections. The voltage which thus appears across the output winding section is poled to pass through the rectifier connected in series therewith, so that output current flows. The voltage produced in the second winding section while the switching transistor is nominally off is effective to ensure that the switching transistor is and remains fully off. Because the output current, when it flows, is electromagnetically induced, it will rise and then fall, and once it falls sufficiently its effect on the first winding section and the switching transistor connected in series therewith will be such as to cause that transistor to turn back on. Thus the system will oscillate between switch-on and switch-off conditions.

A bypass transistor is associated with the switching transistor, and it is that bypass transistor which is affected by the feedback signal so as to modify the "off" and "on" times of the switching transistor. Regulation is achieved by sensing a parameter such as input or output voltage or output current and causing the signal thus produced to modify the action of the bypass transistor, thereby hastening or delaying the time in the cycle when the switching transistor shifts from on to off conditions. One way in which this can be done is through the use of a second bypass transistor connected across the biasing circuit for the control electrode of the first bypass transistor.

For placing the system into a condition of oscillation a starting bias or signal is provided. As here specifically disclosed this takes the very simple form of directly connecting the switching transistor to a source of power. Once the system reaches an oscillatory condition the starting signal is disabled, as by being bypassed, thus permitting the system to oscillate producing a regulated or regulatable output.

Regulation in accordance with input voltage or output voltage or both is desirable. Overriding control based on an output current limiting feature is highly desirable. Two embodiments are here specifically disclosed by way of example, the first featuring accurate output voltage regulation, and the second featuring regulation against changes of the input voltage, based on magnetic interaction between the output winding section and a control winding section on the power transformer, and both having a current-limiting characteristic.

To the accomplishment of the above and to such other objects as may hereinafter appear, the present invention relates to a power supply of the switching type as disclosed in this specification, taken together with the accompanying drawings, in which:

FIG. 1 is a circuit diagram of one preferred embodiment of the present invention, characterized by current limiting and output voltage regulation; and FIG. 2 is a circuit diagram of a second preferred embodiment of the present invention, characterized by current limiting and regulation based on input voltage.

In the embodiment of FIG. 1, the power supply has a pair of input terminals 2 and 4 which are adapted to be connected across a DC power supply and a pair of output terminals 6 and 8 at which the DC output is produced. The output at the terminals 6 and 8 may be nominally the same as or different from the input at the terminals 2 and 4 with respect to voltage and/or current, depending in part on the turns ratio between the operating winding sections of a transformer generally designated 10, which has first (input), second (feedback) and third (output) winding sections 12, 14 and 16 respectively, here shown for purpose of illustration as separate windings. The first or input winding section 12 is connected across the input terminals 2 and 4 in series with the output electrodes 18 and 20 of a switching transistor generally designated 22, a resistor 24 being connected between the emitter 20 of the transistor 22 and the ground or reference potential line 26 connected to the input terminal 4. For power handling purpose a second switching transistor 22', having output terminals 18' and 20' respectively, is adapted to be connected in Darlington fashion with the transistor 22, the emitter 20' of the transistor 22' being connected to the base or control electrode 28 of the transistor 22. The transistor 22' has a corresponding control electrode 28'. For purposes of clarity in the succeeding discussion, only the switching transistor 22 will be specifically referred to, and it will be understood that in fact such reference is to one or more individual transistors which function co-operatively.

The third or output winding section 16 is connected to the output electrodes 6 and 8 via leads 29 and 30, with rectifier 32 being connected in lead 29 and with capacitor 34 connected across the output terminals 6 and 8.

Lead 36 and resistors 38 and 40 connect the positive input terminal 2 to the base 28 of the switching transistor 22, thus providing initial starting current therefor. Bypass transistor 42 has its output electrodes 44 and 46 connected between reference potential line 26 and a point 48 located between the resistors 38 and 40. The control electrode 50 of the transistor 42 is connected by resistor 52 to point 54 located between capacitor 56 and rectifier 58, the capacitor 56 in turn being connected to reference potential line 26 and the rectifier 58 in turn being connected, by leads 60 ad 62, to one end of the second or feedback winding section 14, the other end of the feedback winding section 14 being connected to reference potential lead 26.

Connected in series between lead 60 and reference lead 26 is resistor 64 and the output electrodes 66 and 68 of bypass transistor 70. A pair of resistors 72 and 74 are connected between the reference voltage line 26 and the control electrode 28 of the switching transistor 22. The control electrode 76 of the transistor 70 is connected to point 78 between the resistors 72 and 74. Point 78 is also connected by resistor 80 and the output electrodes 82 and 84 of a second bypass transistor 86 to the reference voltage line 26. The control electrode 88 of the transistor 86 is connected to the reference voltage line 26 by winding 90 of transformer 92, the other winding 94 of which is connected by leads 96 to the output of an error sensing transducer 98 of any appropriate design. That transducer has two inputs 100 and 102, the input 100 being connected to any appropriate reference voltage source and the input 102 being connected to the output terminals 6 and 8, thereby to sense the output voltage.

Resistors 104 and 106 and rectifier 108 are connected in series between the reference voltage line 26 and point 110 between the leads 60 and 62.

Capacitor 112 and resistor 114 may be connected in series across the input terminals 2 and 4, with rectifier 116 connecting points 118 and 111, point 118 being located between capacitor 112 and resistor 114 and point 111 being located between the first winding section 12 and the output electrode 18 of switching transistor 22, thereby to define a spike-suppression circuit.

The mode of operation of the system is as follows: When the terminals 2 and 4 are connected to an appropriate source of power the control electrode 28 of the switching transistor 22 is supplied with base current through lead 36 and resistors 38 and 40, and the output circuit of transistor 22 is rendered conductive, the transistor 22 thus being placed in its "on" condition. Current will thus flow and build up through the first winding section 12 and the switching transistor 22, producing a voltage in the winding 12 with the polarity indicated on the drawing, and this will in turn induce voltages in the second and third winding sections 14 and 16 respectively with the polarities there indicated. As the positive voltage at the upper end of the second winding section 14 builds up, this voltage is transferred to the base of the switching transistor 22, thus driving it to saturation and ensuring that it turns substatnially fully on. The current through the winding section 12 and the switching transistor 22 will continue to rise. That current flows through resistor 24, and as it increases the upper end of resistor 24 will become increasingly positive with respect to the reference potential. Thus the voltage of the control electrode 28 will rise and a given proportion of that voltage as determined by the relative values of the resistors 72 and 74, which define a voltage divider, will be applied to the control electrode 76 of the transistor 70. As the potential of the control electrode 76 rises, the output circuit between the electrodes 66 and 68 of the transistor 70 becomes conductive, and hence some of the current for the base or control electrode 28 will be bypassed to ground via the transistor 70. The conductivity of the output circuit of the switching transistor 22 will therefore be reduced, the voltage in the output circuit of the transistor 22 will increase, and the current through the first winding section 12 will start to decrease. This will in turn produce less of a positive voltage at the upper end of the second winding section 14, this will further reduce the energization of the control electrode 28 of the switching transistor 22, and this effect will be progressive until the switching transistor 22 shifts to an "off" condition.

During the time that the switching transistor 22 has been on, the current through the first winding section 12 is built up and a voltage has been induced in the third or output winding section 16, but the polarity of that voltage will be opposite to the polarity of the rectifier 32, and hence no output current will flow.

When the switching transistor 22 turns off the polarity of the voltage in the first winding section 12 will reverse because of electromagnetic interaction. This will produce in the second winding section 14 of a voltage of reverse polarity which, when applied to the control electrode 28 of the transistor 22, will drive that control electrode negative through rectifier 108 and resistor 106, thus hastening and ensuring the substantially complete turnoff of the switching transistor 22. At the same time a voltage of opposite polarity will be induced in the third or output winding section 16, and since this voltage is not opposed to the polarity of rectifier 32, output current will flow. This output current will rise in accordance with conventional electromagnetic interaction and then will fall. When it returns substantially to zero the diode 32 will act to open the output circuit. However, the effect of the inductance of the winding section 16, particularly in conjunction with the capacitance of the windings, will cause the voltage across the third winding section 16 to overshoot somewhat to the polarity shown in the drawing, the diode 32 carrying a small reverse current. This will induce in the first winding section 12 a voltage of the polarity shown in the drawing and that voltage, when applied to the switching transistor 22 (both directly to the output electrode 18 and indirectly, via the second winding section 14, to the control electrode 28) will cause the switching transistor 22 to start to turn back on, thus starting the next cycle of oscillation.

If the starting impulse provided to the switching transistor control electrode 28 is permitted to continue to exist, system oscillation will be difficult to achieve, and in some instances may not occur, because of the necessity of overcoming that starting signal, which tends to cause the switching transistor 22 to be in an "on" condition. Hence means are provided for disabling the starting signal as soon as the system is in a potentially oscillatory condition. This is accomplished by means of the transistor 42, whose output electrodes 44 and 46 shunt the starting circuit 36, 38 to the reference potential line 26 whenever the control electrode 50 is appropriately charged. As soon as the switching transistor 22 turns on (as it will be in response to the signal from the starting circuit 36, 38) a positive voltage will be induced at the upper end of the second winding section 14 and this positive voltage will be applied via lead 60 and rectifier 58 to the control electrode 50 of the transistor 42, thus turning that transistor on and causing the starting signal to be bypassed to ground. The capacitor 56 will also be charged, and thus the control electrode 50 will remain positive, keeping the transistor 42 conductive, as the system oscillates between switch-on and switch-off conditions. When the system is turned off, that is to say, when the voltage source is disconnected from the input terminal 2, the capacitor 56 will discharge through the base-emitter circuit of the transistor 42, thus restoring the circuit to its initial stand-by condition.

The output voltage across the electrodes 6 and 8 charges the capacitor 34 and that output voltage is fed to the input 102 of the error sensing transducer 98, where that voltage is compared with the reference voltage input 100. The output of the error sensing transducer 98 is applied to the winding 94 of the transformer 92, thereby affecting the secondary winding 90, which in turn controls the energization of the control electrode 88 of the transistor 86. The output electrodes 82 and 84 of the transistor 86 are connected in shunt across, and constitute a bypass for, the energizing circuit for the control electrode 76 of the transistor 70, and hence the conductive status of the transistor 86 will determine the degree to which the transistor 70 is affected by the voltage of the switching transistor control electrode 28, and hence how long it will take the transistor 70 to cause the switching transistor 22 to turn off. When no signal is applied to the control electrode 88 of the transistor 86, the transistor 86 remains off and the transistor 70 will turn on in normal fashion, thus turning transistor 22 off a predetermined time after it has turned on. As a signal is applied to the control electrode 88 of the transistor 86, and as that signal increases, more and more of the energization for the control electrode 76 of the transistor 70 will be bypassed, it will take a longer and longer time for the transistor 70 to cause the switching transistor 22 to turn off, the current through the winding section 12 will continue to build up for a longer and longer time, and hence the voltages induced in the output winding 16 will increase. It is in this way that the error sensing transducer 98 is effective to maintain the voltage output at a predetermined value; the signal sent by the transformer 92 to the transistor 86 will vary as the output voltage varies, increasing the "on" time of the transistor 22 as the output voltage falls below its predetermined nominal value and decreasing the "on" time of the switching transistor 22 as the output voltage rises above its nominal value. The overall frequency of oscillation of the system will in a typical instance vary with load between 5–20 kilohertz.

It will be seen from the above that a simple and accurate regulated power supply has been disclosed. The input terminals 2 and 4 and the output terminals 6 and 8 are isolated, but the transformer 10 which produces that isolation operates at frequencies much higher than power frequencies (on the order of kilohertz, for example), thus resulting in a great saving in size, weight and expense insofar as the transformer is concerned. The output voltage is sensed directly at the output and, after being compared with a reference, is applied directly to the oscillatory system, thus producing good regulation. The circuitry is quite simple when compared with prior art systems, not only because no special timing circuit need be provided, but also because only a single switching stage is employed. This not only eliminates the second switching stage but also eliminates the use of complex balancing circuitry needed when two switching stages are employed. While the use of but a single switching stage does have the effect of causing the switching transistor to carry a relatively high proportion of the total power, this is entirely satisfactory in power supplies designed to handle amount of power up to several hundred watts.

In the embodiment of FIG. 1, above described, the output voltage is sensed and accurate regulation in accordance therewith is achieved. In addition, a current limiting feature is incorporated into the system. There are, however, applications where such accurate output voltage regulation is not required, and where regulation primarily on the basis of the input voltage is satisfactory. In such instances a simplified circuit which omits the error sensing transducer 98 and its associated circuitry may be employed. A typical such circuit is disclosed in FIG. 2, in which, to a large extent, parts corresponding to parts in the FIG. 1 embodiment have been given the same reference numerals as were applied in FIG. 1.

In the FIG. 2 embodiment the second winding section 14 is connected between the reference voltage line 26 and the lead 62. Connected across the second winding section 14 are series connected diode 200 and capacitor 202, the polarity of the diode 200 being such that the upper electrode of the capacitor 202 is charged negatively relative to the reference voltage at line 26 each time that the upper end of the winding 14 is negative, the diode 200 preventing discharge of the capacitor 202 during those portions of the cycle of operation of the apparatus when the upper end of the second winding section 14 is positive. Since the second winding section 14 is inductively related to the third winding section 16, and since the voltage induced in this third winding section 16 during the off-intervals of the primary circuit (transistor 22) is limited through diode 32 to the voltage across the output capacitor 34, the voltage generated in the second winding section 14 during the off-intervals of the primary circuit, taking into account the turns ratio, will closely represent the output voltage. Hence, the voltage across capacitor 202 will likewise be representative of that output voltage.

The lead 62 is connected by resistor 64 and lead 204 to the control electrode 28 of the switching transistor 22. A diode 206 is connected between the lead 204 and the line 26. A transistor 208 has its control electrodes 210 and 212 connected between lead 204 and line 26. Its control electrode 214 is connected to point 216. Resistor 218 and diode 220 are connected in series between the point 216 and the line 62. Another transistor 222 has its output electrodes 224 and 226 connected between point 216 and line 26. Its control electrode 228 is connected to point 230, which is in turn connected to point 232. A capacitor 234 connects points 216 and 232. Resistor 236 connects point 232 to lead 36, which in turn is connected to the positive input terminal 2. A Zener diode 238 connects point 232 to point 240 located between the diode 200 and the capacitor 202.

A transistor 70' has its output electrodes 66' and 68' connected between point 230 and line 26. Its control electrode 76' is connected by resistor 72' to the control electrode 28 of the switching transistor 22. A resistor 74' connects the control electrode 76' of the transistor 70' to the point 240.

In describing the operation of the system of FIG. 2 we start with the transistor 22 non-conductive, this representing the "off" period of conduction in the primary winding. During the first portion of this "off" period, while the current through the winding section 16 is first decaying, the voltage induced at the upper end of the winding section 14 is negative. Hence line 62 is at a negative potential. Part of that negative potential, limited by the diode 206, is applied to the control electrode 28 of the switching transistor 22, thus ensuring that said transistor is off. Point 210 is then at a negative potential, and as a result point 216 is driven to a zero potential through the collector-base junction of transistor 208. Just prior to the time that the transistor 22 turned off, both of transistors 208 and 222 were on, and as a result the points 216 and 232 were at substantially the same potential. Hence the capacitor 234 is not charged to any appreciable degree.

As the "off" period continues, charging current for the point 232 is provided through lead 36 and resistor 236, so that the voltage of the point 232 rises to some value less than that needed to cause transistor 222 to become conductive. For purposes of explanation we will assume that a voltage of 0.6 volt is required at the control electrode 228 to render the transistor 222 conductive, and that during this first portion of the "off" period of primary conduction, the voltage at point 232 has risen to 0.4 volt.

As the "off" period of primary conduction continues, the current in the winding section 16 commences to collapse, thus producing the polarity shown in FIG. 2. Hence line 62 rises to a positive potential. That potential, through diode 220 and resistor 218, causes the potential of point 216 to rise, and, through capacitor 234, causes the potential of point 232 to also rise, point 232 always being some value (e.g. 0.4 volt) above point 216.

When the voltage at point 232 reaches that value required to render transistor 222 conductive, any further rise of point 216 will be controlled through transistor 222 in conjunction with capacitor 234, acting as an integrating amplifier. The rate of rise will depend on how much of the charging current of capacitor 234 will be carried away by the Zener diode 238. This, in turn, depends on the output voltage of the power supply, represented by the negative potential at point 240, as explained above. The rise will be slow (resulting in an increased on-period of the primary circuit) if the output voltage is less than the desired value; it will be fast (resulting in a reduced period of primary conduction) if the output voltage is too high.

Finally, when the voltage at point 216 has reached the value required to render transistor 208 conductive, said transistor 208 bypasses the charging current for transistor 22, and the latter becomes non-conductive, thus terminating the "on" period of primary conduction.

Because of the regulation inherent in the transformer 10, for the compensation of which no provision is made in the circuit of FIG. 2, real output voltage regulation, in the sense in which this term is generally used, is not provided by that circuit. However, the voltage at point 240 will closely represent the output voltage. Thus, the circuit will regulate for variations in the input or line voltage across terminals 2 and 4.

Superimposed upon that line or input voltage regulation is a current limiting feature produced by the transistor 70', which acts in substantially the same fashion as the transistor 70 of the embodiment of FIG. 1. When the transistor 70' is conductive the voltage at point 232 is reduced, thereby producing the same results as if the voltage at point 240 had increased negatively.

Thus a circuit of the type shown in FIG. 2 is significantly simpler than the one disclosed in FIG. 1, yet it gives rise to line voltage regulation and, if desired, current limiting, and has the same basic advantages as the more sophisticated FIG. 1 circuit.

While but a limited number of embodiments of the present invention have been here specifically disclosed, it will be apparent that many variations may be made therein, all within the scope of the instant invention.

I claim:

1. A DC power supply comprising a DC power source, a transformer having first, second and third winding sections, an output circuit connected to said third winding section via a rectifier, first transistor means having output electrode means and control electrode means and adapted to be operated in a switching mode through energization of its control electrode means, said first winding section and said output electrode means of said first transistor means being connected across said power source, means including said second winding section operatively connected to said control electrode means of said first transistor means for providing a normal bias thereto so as to put it in a switch-on and switch-off mode respectively when the voltage across said first winding section is in a given sense and the opposite sense respectively, a second transistor means having output electrode means and control electrode means, said output electrode means of said second transistor means defining a bypass for said normal biasing means, current-sensitive means having an output corresponding to the current in said first winding section, and means operatively connecting said control electrode means of said second transistor means to said sensing means and effective to modify the bypass action of said second transistor means, and hence the relative switch-on and switch-off times of said first transistor means, as said output current varies, said first transistor thereby controllably oscillating between switch-on and switch-off modes, causing controlled voltages in opposite senses to appear across said winding sections, and producing a controlled voltage output in said output circuit, and voltage sensing means comprising an integrating amplifier having an input operatively connected to said power source, and having an output, said means operatively connecting said control electrode means of said second transistor means to said voltage sensing means comprising a connection between said control electrode means and said integrating amplifier output, thereby to sense the voltage of said power source and control said power supply in accordance therewith.

2. In the power supply of claim 1, an additional input circuit connected to said integrating amplifier comprising a capacitor and a rectifier connected in series across one of said winding sections, and an additional input signal tap connected to a point between said capacitor and rectifier and connected to said integrated amplifier.

3. The power supply of claim 2, in which said connection between said integrating amplifier and said additional input signal tap comprises a Zener diode, an additional input circuit connected to said integrating amplifier comprising a capacitor and a rectifier connected in series across one of said winding sections, and an additional input signal tap connected to a point between said capacitor and rectifier and connected to said integrating amplifier.

4. The power supply of claim 2, in which said connection between said integrating amplifier and said additional input signal tap comprises a Zener diode, an additional input circuit connected to said integrating amplifier comprising a capacitor and a rectifier connected in series across one of said winding sections, and an additional input signal tap connected to a point between said capacitor and rectifier and connected to said integrating amplifier, and in which said integrating amplifier comprises a connection between said control electrode means of said second transistor means and said power source input, and a capacitor operatively connected between said control electrode means and an output electrode means of said second transducer means.

5. The power supply of claim 1, in which said integrating amplifier comprises a connection between said control electrode means of said second transistor means and said power source input, and a capacitor operatively connected between said control electrode means and an output electrode means of said second transducer means.

6. In the power supply of claim 1, an additional input circuit connected to said integrating amplifier comprising a capacitor and a rectifier connected in series across one of said winding sections, and an additional input signal tap connected to a point between said capacitor and rectifier and connected to said integrating amplifier, and in which said integrating amplifier comprises a connection between said control electrode means of said second transistor means and said power source input, and a capacitor operatively connected between said control electrode means and an output electrode means of said second transducer means.

7. In the power supply of claim 1, an additional transistor means having control electrode means and output electrode means, said output electrode means of said additional transistor means being connected between at least one of said inputs to said integrating amplifier and a source of reference potential, means for sensing the current in said output circuit, and means for connecting said current sensing means with said control electrode means of said additional transistor means.

8. In the power supply of claim 1, an additional transistor means having control electrode means and output electrode means, said output electrode means of said additional transistor means being connected between at least one of said inputs to said integrating amplifier and a source of reference potential, and means for connecting said current sensitive means with said control electrode means of said additional transistor means, an additional input circuit connected to said integrating amplifier comprising a capacitor and a rectifier connected in series across one of said winding sections, and an additional input signal tap connected to a point between said capacitor and rectifier and connected to said integarting amplifier.

9. In the power supply of claim 1, an additional transistor means having control electrode means and output electrode means, said output electrode means of said additional transistor means being connected between at least one of said inputs to said integrating amplifier and a source of reference potential, and means for connecting said current sensitive means with said control electrode means of said additional transistor means, an additional input circuit connected to said integrating amplifier comprising a capacitor and a rectifier connected in series across one of said winding sections, and an additional input signal tap connected to a point between said capacitor and rectifier and connected to said integrating amplifier, said connection between said integrating amplifier and said additional input signal tap comprising a Zener diode.

10. In the power supply of claim 1, an additional transistor means having control electrode means and output electrode means, said output electrode means of said additional transistor means being connected between at least one of said inputs to said integrating amplifier and a source of reference potential, and means for connecting said currrent sensitive means with said control electrode means of said additional transistor means, in which said integrating amplifier comprises a connection between said control electrode means of said second transistor means and said power source input, and a capacitor operatively connected between said control electrode means and an output electrode means of said second transducer means.

11. In the power supply of claim 1, an additional transistor means having control electrode means and output electrode means, said output electrode means of said additional transistor means being connected between at least one of said inputs to said integrating amplifier and a source of reference potential, and means for connecting said current sensitive means with said control electrode means of said additional transistor means, an additional input circuit connected to said integrating amplifier comprising a capacitor and a rectifier connected in series across one of said winding sections, and an additional input signal tap connected to a point between said capacitor and rectifier and connected to said integrating amplifier, and in which said integrating amplifier comprises a connection between said control electrode means of said second transistor means and said power source input, and a capacitor operatively connected between said control electrode means and an output electrode means of said second transducer means.

12. In the power supply of claim 1, an additional transistor means having control electrode means and output electrode means, said output electrode means of said additional transistor means being connected between at least one of said inputs to said integrating amplifier and a source of reference potential, and means for connecting said current sensitive means with said control electrode means of said additional transistor means, an additional input circuit connected to said integrated amplifier comprising a capacitor and a rectifier connected in series across one of said winding sections, and an additional input signal tap connected to a point between said capacitor and rectifier and connected to said integrating amplifier, said connection between said integrating amplifier and said additional input signal tap compriisng a Zener diode, said integrating amplifier comprising a connection between said control electrode means of said second transistor means and said power source input, and a capacitor operatively connected between said control electrode means and an output electrode means of said second transducer means.

13. A DC power supply comprising a DC power source, a transformer having first, second and third winding sections, an output circuit connected to said third winding section via a rectifier, first transistor means having output electrode means and control electrode means and adapted to be operated in a switching mode through energization of its control electrode means, said first winding section and said output electrode means of said first transistor means being connected across said power source, means including said second winding section operatively connected to said control electrode means of said first transistor means for providing a normal bias thereto so as to put it in a switch-on and switch off mode respectively when the voltage across said first winding section is in a given sense and the opposite sense respectively, a second transistor means having output electrode means and control electrode means, said output electrode means of said second transistor means defining a bypass for said normal biasing means, current-sensitive means having an output corresponding to the current in said first winding section, and means operatively connecting said control electrode means of said second transistor means to said sensing means and effective to modify the bypass action of said second transistor means, and hence the relative switch-on and switch-off times of said first transistor means, as said output current varies, said first transistor thereby controllably oscillating between switch-on and switch-off modes, causing controlled voltages in opposite senses to appear across said winding sections, and producing a controlled voltage output in said output circuit, and means for sensing the voltage of said power source and for producing a signal which changes its value at a rate dependent on said voltage, means operatively connecting said signal to said control electrode means of said second transistor means so that the conductive status of said second transistor means is changed when said signal reaches a predetermined value, and means for cyclically resetting said signal.

14. The power supply of claim 13, in which said resetting means comprises a rectifier and resistor series-connected between said control electrode means of said second transistor means and said second winding section.

15. The power supply of claim 13, in which said voltage-sensing signal-producing means comprises an integrating amplifier, and in which said resetting means comprises a rectifier and resistor series-connected between said control electrode means of said second transistor means and said second winding section.

16. The power supply of claim 13, in which said voltage-sensing signal-producing means comprises an integrating amplifier.

17. A DC power supply comprising a DC power source, a transformer having first, second and third winding sections, an output circuit connected to said third winding section via a rectifier, first transistor means having output electrode means and control electrode means and adapted to be operated in a switching mode through energization of its control electrode means, said first winding section and said output electrode means of said first transistor means being connected across said power source, means including said second winding section operatively connected to said control electrode means of said first transistor means for providing a normal bias thereto so as to put it in a switch-on and switch off mode respectively when the voltage across said first winding section is in a given sense and the opposite sense respectively, a second transistor means having output electrode means and control electrode means, said output electrode means of said second transistor means defining a bypass for said normal biasing means, current-sensitive means having an output corresponding to the current in said first winding section, and means operatively connecting said control electrode means of said second transistor means to said sensing means and effective to modify the bypass action of said second transistor means, and hence the relative switch-on and switch-off times of said first transistor means, as said output current varies, said first transistor thereby controllably oscillating between switch-on and switch-off modes, causing controlled voltages in opposite senses to appear across said winding sections, and producing a controlled voltage output in said output circuit, and means for supplying a starting signal to said first transistor means, means for sensing when said first transistor means is in a potentially oscillatory condition, and means for disabling said starting signal supplying means when said potentially oscillatory condition is sensed.

18. In the power supply of claim 17, second sensing means for sensing, as a second given parameter, the voltage of said output circuit, and means for modifying the bypass action of said second transistor means in accordance with said sensed voltage so as to vary the relative switch-on and switch-off times of said first transistor means, thereby to provide an output voltage regulating feature to said power supply.

19. The power supply of claim 18, said modifying means comprising third transistor means having output electrode means and control electrode means, said control electrode means being connected to said second sensing means and said output electrode means being connected between a reference voltage and said control electrode means of said second transistor means.

20. The power supply of claim 18, said second winding section comprising said means for sensing when said first transistor means is in a potentially oscillatory condition, said starting signal disabling means comprising another transistor means effective to bypass said starting signal when an actuating signal derived from said second winding section is applied thereto, said other transistor means comprising output electrode means and control electrode means, said output electrode means being connected between said starting signal supplying means and a reference potential, a rectifier and capacitor connected in series across said second winding section, said control electrode means of said other transistor means being connected to a point between said rectifier and said capacitor.

21. The power supply of claim 17, said second winding section comprising said means for sensing when said first transistor means is in a potentially oscillatory condition, said starting signal disabling means comprising another transistor means effective to bypass said starting signal when an actuating signal derived from said second winding section is applied thereto, said other transistor means comprising output electrode means and control electrode means, said output electrode means being connected between said starting signal supplying means and a reference potential, a rectifier and capacitor connected in series across said second winding section, said control electrode means of said other transistor means being connected to a point between said rectifier and said capacitor.

References Cited

UNITED STATES PATENTS

| | | | |
|---|---|---|---|
| 2,791,739 | 5/1957 | Light | 321—2 |
| 3,331,033 | 7/1967 | Johnston | 321—2 X |
| 3,400,319 | 9/1968 | Stich | 321—2 |
| 3,419,781 | 12/1968 | Jullien-Davin | 321—2 |
| 3,435,320 | 3/1969 | Lee et al. | 321—2 |

J. D. MILLER, Primary Examiner

W. H. BEHA, Jr., Assistant Examiner

U.S. Cl. X.R.

321—18; 331—112